US012757872B1

(12) United States Patent
Schröder et al.

(10) Patent No.: US 12,757,872 B1
(45) Date of Patent: Oct. 13, 2026

(54) APPARATUS FOR THE SKULL ATTACHMENT AND HEAD-FIXATION OF BEHAVING SMALL ANIMALS

(71) Applicant: 3Dneuro B.V., Nijmegen (NL)

(72) Inventors: Tim Schröder, Nijmegen (NL); Martha Nari Nemri-Havenith, Nijmegen (NL)

(73) Assignee: 3DNEURO B.V., Nijmegen (NL)

( * ) Notice: Subject to any disclaimer, the term of this patent is extended or adjusted under 35 U.S.C. 154(b) by 0 days.

(21) Appl. No.: 19/234,738

(22) Filed: Jun. 11, 2025

(51) Int. Cl.
*A01K 15/04* (2006.01)

(52) U.S. Cl.
CPC .................................... *A01K 15/04* (2013.01)

(58) Field of Classification Search
CPC ...................................................... A01K 15/04
USPC ........................................... 119/815; 128/845
See application file for complete search history.

(56) References Cited

U.S. PATENT DOCUMENTS 4,887,553 A * 12/1989 Trevelyan ............ A01K 1/0613 119/800
8,028,663 B2 * 10/2011 Chen ........................ A61D 3/00 119/815
2022/0295743 A1 * 9/2022 Dobos .................. A01K 15/027
2023/0017168 A1 1/2023 Ventalon et al.

FOREIGN PATENT DOCUMENTS

WO WO-2022196602 A1 * 9/2022 ............. A01K 29/00
WO WO-2024226744 A1 * 10/2024 ........... A01K 1/0613

OTHER PUBLICATIONS

Machine Translation of WO-2022196602-A1, Matsuzaki, Masanori, Sep. 22, 2022 (Year: 2022).*

Akemann, W., Fast optical recording of neuronal activity by three-dimensional custom-access serial holgraphy, Nature Methods, Jan. 2022, pp. 100-110, vol. 19, www.nature.com/nature/methods, https://doi.org/10.1038/s41592-021-01329-7.

Kim, S., A miniature kinematic coupling device for mouse head fixation, Journal of Neuroscience Methods, Feb. 28, 2022, pp. 1-9, vol. 372, https://doi.org./10.1016/j.neumeth.2022.109549.

* cited by examiner

*Primary Examiner* — Kimberly S Berona
*Assistant Examiner* — Katherine June Walter
(74) *Attorney, Agent, or Firm* — Hudak, Shunk & Farine Co. LPA

(57) ABSTRACT

An apparatus for the head-fixation of small animals for experimental purposes. Head-fixation immobilizes the head, enabling precise brain recordings while animals are able to move without further restriction on devices such as a tread-mill. The apparatus aims to minimize the stress the animal undergoes from being restrained, in order to maximize the quality and relevance of brain recordings while monitoring the animal's physiological state during complex cognitive tasks. The apparatus for head-fixation of small animals comprises a frame, typically called headplate, that is permanently attached to the skull. The headplate encloses an open space over the skull, through which the brain can be accessed for recording. The apparatus also includes a one-hand actuated spring clamp and a docking frame. Head-fixation is achieved in 2 steps: 1) The headplate is grabbed using the spring clamp 2) the whole assembly is attached to the docking frame.

20 Claims, 6 Drawing Sheets

APPARATUS FOR THE SKULL ATTACHMENT AND HEAD-FIXATION OF BEHAVING SMALL ANIMALS

FIELD OF THE INVENTION

The present invention relates to an apparatus for head fixation of small animals which allows scientific studies to be performed on the animals. More particularly, the invention relates to an apparatus including a headplate that is adapted to be secured to an animal's skull, a one-hand actuated clamping device capable of a mating interlocking connection with the headplate, and a docking frame interlockable with the clamping device that facilitates studies in the fields of behavioral science and neuroscience performed on small laboratory animals, for example rodents.

BACKGROUND OF THE INVENTION

In neuroscience research, head-fixation is a widely employed technique to immobilize the head of experimental subjects, primarily in order to stabilize the brain for recording purposes. It is typically used to immobilize awake human subjects for non-invasive brain recordings (e.g. functional magnetic resonance imaging) and for both invasive and non-invasive recordings in anesthetized animals. More recently, head-fixation started being used in awake, behaving animals. Having the head immobilized simplifies several brain recording techniques such as electrophysiology, two-photon microscopy or functional magnetic resonance imaging in 2 ways: 1) the immobilized animal can be placed into or under the typically very large measurement device, and 2) the animal can be optimally positioned and kept steady for each recording technology. The same applies for manipulation techniques of brain activity, such as optogenetic control. And while brain activity is recorded and/or manipulated, the animal can simultaneously engage in various behavioral tasks. Therefore, head-fixation of awake behaving animals allows experiments utilizing a combination of brain activity measurements and manipulations along with behavioral characterization of spontaneous or task-related responses on a precise spatiotemporal scale.

Indeed, while the head is immobilized, the rest of the animal's body can be restrained according to the experimental needs, from entirely restrained (e.g. harness in MRI scanner) to not restrained at all (e.g. treadmill). As such, awake head-fixed experiments contrast with experiments where animals are unrestrained. Imagine an animal moving unrestrained in a maze: There, the animal must carry at least part of the recording equipment, if not all of it. And there will usually be a cable to provide power and transfer data to a computer. Not all brain recording technologies can be miniaturized to that extent (e.g. MRI scanner) and when they can be miniaturized, trade-offs on recording precision and throughput must be made. In addition to rendering the above mentioned trade-offs irrelevant, head-fixation provides 1) the ability to present controlled stimuli to the animal and 2) improved quantification of behavioral responses due to the ability to position high-resolution instruments in optimal conditions around the head-fixed animal.

The exact method of head-fixation depends on the scientific question, the type of brain/behavior recordings necessary to answer it and the choice of laboratory animal. Consider the laboratory mouse for example. When anesthetized, head fixation with ear bars might be sufficient. When awake and free to move on a treadmill, head fixation will be typically more invasive, and involve the attachment of a device directly onto the skull of the animal. That device would then be attached to a structural element to achieve head-fixation. The head-fixation device (often called headplate) will need to fill various requirements: For example, in MRI scanners, ferromagnetic metals cannot be used as material to make the headplate, while for optical imaging at cellular resolution, the headplate must be very rigid and stable in order to maintain the imaging field of view and minimize motion artifacts. Other requirements might include the need for the headplate not to interfere with the animal's senses, for example by obstructing its visual field. Further requirements can be motivated by animal welfare considerations as well as measures to reduce the stress caused by the head-fixation procedure. Indeed, stress tends to negatively impact behavioral task learning and performance, as well as introduce confounding signals in brain activity, making subsequent analyses more difficult. To reduce animal stress, some approaches rely on training animals to voluntarily head-fix themselves (e.g. Kim et al. 2022 DOI: https://doi.org/10.1016/j.jneumeth.2022.109549). Other approaches focus on devices including a body provided with a base that can be attached to a bone surface of an animal within seconds to the structural element, so as to minimize any handling steps (e.g. fiddling with a hard-to-reach screw) that could perturb or stress the animal. For example, Akemann and collaborators (2022; DOI: https://doi.org/10.1038/s41592-021-01329-7, see FIG. 3*a*) use a dovetail connection secured by a lever to attach the device to the structural frame.

U.S. Patent Application Publication 2023/017168 A1 relates to a device for connecting a laboratory animal to at least one experimentation system including a body provided with a base for fastening to a bone surface of the animal and at least one element for connection to the experimentation system. The base comprises a perforated fastening structure that has a proximal face with a shape complementary to that of the bone surface and, opposite the proximal face, a distal face that delimits at least two fastening openings emerging at the proximal and distal faces. A method for fastening such a device to a laboratory animal is also disclosed.

Despite the abovementioned attempts for providing head-fixation methods, further development is needed to provide improved arrangements and methods for head-fixation of small animals that minimize stress. Especially, fast seamless attachment and the possibility to acclimatize the animals to head-fixation in familiar environments such as their home cage are still lacking.

SUMMARY OF THE INVENTION

In order to minimize the stress experienced by small animals being head-fixed during awake neuroscience experiments—while keeping all the advantages of typical head-fixation systems—the invention concerns an apparatus for head-fixation of small animals that comprises at least:

A. a headplate. The headplate is preferably permanently attached to the skull surface of the animal. It can include an open space, granting access to the skull for non-invasive or invasive brain recordings. The headplate also includes a frame shaped so as to be compatible with a clamping device;

B. a one-hand actuated spring clamping device; and

C. a docking frame.

The clamping device is first used to attach the headplate, making the small animal head-fixed under the control of the experimenter's hand. The clamping device is then attached to the docking frame, achieving full and stable head-fixation.

Through the docking frame, the invention is attached to a structural element, which allows the apparatus to integrate into the larger equipment involved in brain and behavior recordings.

Due to the spring clamping device being one-hand actuated, and actually handheld and portable, the experimenter can habituate the small animal to being head-fixed in its own cage or other environments the animal is already used to. This is advantageous because experimental setups tend to be more stressful due to the accumulation of recording equipment, lighting, noise and other environmental factors.

Additional advantages of the handheld spring clamping device:

- One-handed operation, which frees the experimenter's other hand for animal handling and other tasks.
- Fast-release clamp allows multiple head-fixations in a short period of time, which multiplies the opportunities for habituation.
- Head-fixation can be trained and habituated independently from locomotion on treadmills and other devices that are used during the experiments.
- By design, locking screws are positioned some distance from the animal's head, minimizing the need for manipulations close to the animal.

In one aspect or embodiment, an apparatus for head fixation of small animals is disclosed, comprising: a headplate that is adapted to be secured to an animal's skull, wherein the headplate includes a frame having a positioning feature shaped to reversibly interlock with a clamping device, wherein the frame has an aperture to allow access to a brain of the animal; a docking frame having a port for forming a reversible interlocking connection to the clamping device; and the clamping device, wherein the clamping device is adapted to be one-handed actuated and has jaws at a headplate attachment end that reversibly interlock with the frame positioning feature of said headplate, wherein the clamping device comprises a movable handle and a non-movable handle to manipulate the jaws and selectively provide the reversible interlock between the jaws and the positioning feature of the headplate frame.

In a further aspect and embodiment, the headplate has an inner frame and an outer frame, wherein the positioning feature is present in the outer frame, and wherein the aperture is present in the inner frame.

In still another aspect and embodiment, the outer frame of the headplate is attached on top of the inner frame of the headplate.

In still a further aspect and embodiment, the positioning feature includes a key that interlocks with a keyhole present in at least one of the jaws.

In a further aspect and embodiment, the inner frame has a ring shape, and wherein the inner frame is adapted to be secured to the animal's skull.

In still a further aspect and embodiment, the movable handle and the non-movable handle of the clamping device are hingedly connected at a pivot point, and wherein a spring is present between the movable handle and non-movable handle that biases the jaws towards each other.

In another aspect and embodiment, the movable handle and the non-movable handle of the clamping device are adapted to be locked into position using a screw that is connected to the jaws.

In a further aspect and embodiment, the clamping device includes a connecting plate attached to the non-movable handle, and wherein the connecting plate reversibly interlocks with the port of the docking frame.

In a further aspect and embodiment, the docking frame comprises an adjustable end and a locking end to secure the docking frame to the connecting plate of the clamping device.

In still a further aspect and embodiment, the docking frame and the clamping device are attached using a dovetail interlocking connection, wherein the docking frame comprises a dovetail socket and the clamping device comprises a dovetail pin that slides into the docking frame dovetail socket.

In yet a further aspect and embodiment, the interlocking between the headplate and the clamping device is passively compliant whereby a user may connect the headplate and clamping device imperfectly in an initial attempt whereafter the interlocking is completed passively with the headplate positioning feature sliding into a keyhole present in at least one of the jaws of the clamping device.

In another aspect and embodiment, an apparatus for head fixation of small animals is disclosed, comprising: a headplate that is adapted to be secured to an animal's skull, wherein the headplate includes a frame having a positioning feature shaped to reversibly interlock with a clamping device, wherein the frame has an aperture to allow access to a brain of the animal; and the clamping device, wherein the clamping device is adapted to be one-handed actuated and has jaws at a headplate attachment end that reversibly interlock with the frame positioning feature of said headplate, wherein the clamping device comprises a movable handle and a non-movable handle to manipulate the jaws and selectively provide the reversible interlock between the jaws and the positioning feature of the headplate frame.

In a still further aspect and embodiment a method for head fixation of small animals is disclosed, comprising the steps of: securing the headplate to an animal's skull; manipulating the clamping device to reversibly interlock the positioning feature of the headplate with a corresponding positioning feature of the jaws; and forming a reversible interlocking connection to the docking device with the clamping device.

In a still further aspect and embodiment, the interlocking between the headplate and the clamping device is passively compliant where a user connecting the headplate and clamping imperfectly allows passive completion of the interlocking by the apparatus whereby the headplate positioning feature slides into a keyhole present in at least one of the jaws of the clamping device.

In a still further aspect and embodiment, further including the step of attaching the docketing frame and clamping device using a dovetail interlocking connection, wherein the docketing frame comprises a dovetail socket and a clamping device comprises a dovetail pin that slides into the docking frame dovetail socket.

For the avoidance of doubt, it is to be understood that while various embodiments or aspects of the invention are described individually, it should be clear that two or more embodiments or aspects can be, and often times are, present in a single apparatus or practiced in a method according to the present invention.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
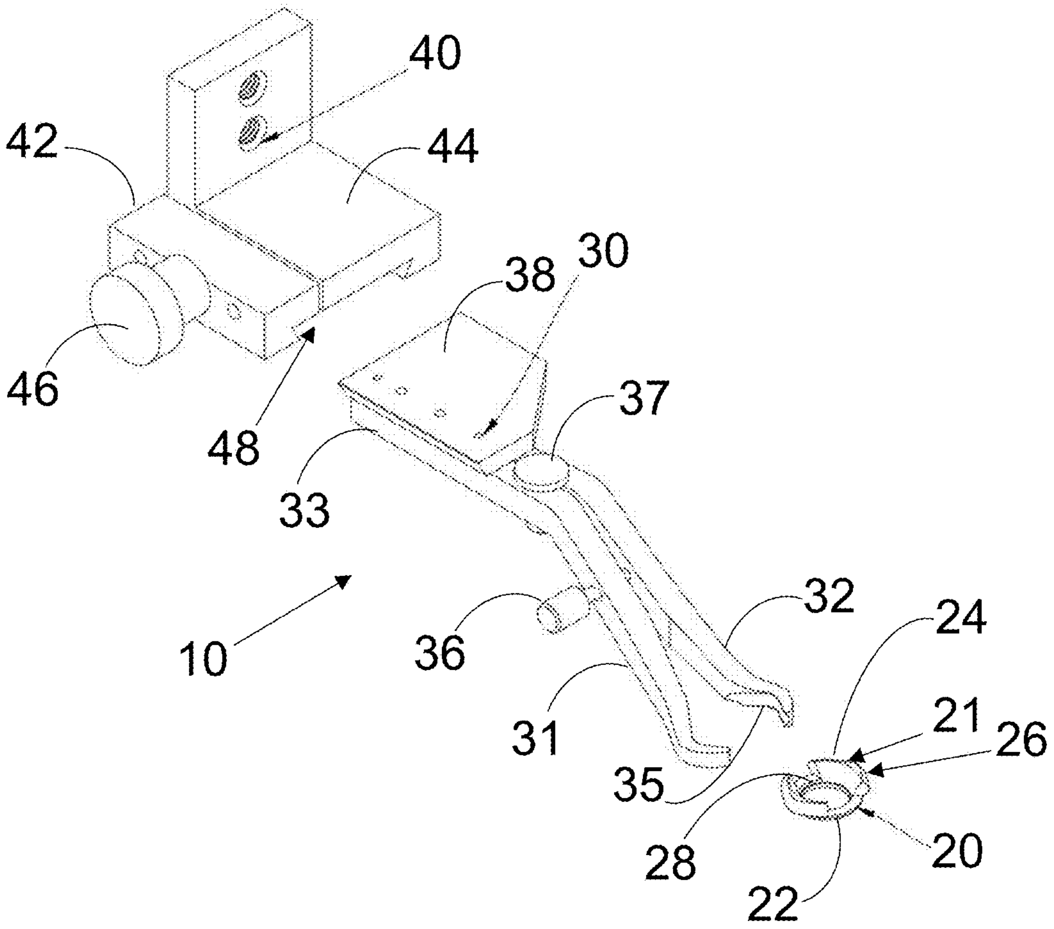
FIG. 1. is an exploded perspective view of one embodiment of an apparatus of the present invention including a headplate, a clamping device, and a docking frame.

Referring to the drawings, an apparatus for head-fixation of small animals is illustrated. In some embodiments, the apparatus may be used with a range of brain recording/manipulation techniques, behavior quantification techniques, individually or in combination. For example, brain activity may be measured invasively with silicone probes implanted into the brain, while behavior may be measured with a camera that captures body and eye movements or other sensors connected to or in the vicinity of the apparatus. Other embodiments may be adapted for use with non-invasive brain recordings such as magnetic resonance imaging or fluorescence microscopy.

As shown in FIG. 1, the apparatus comprises at least three elements. A headplate 20 is to be attached to the skull 50 of the small animal by a surgical procedure. That typically involves the removal of the skin covering the top of the skull 50. After cleaning and drying the skull 50 surface, an adhesive substance or other connecting method such as screws may be applied to permanently connect the headplate 20 to the skull 50. The headplate 20 includes a frame 21 having a positioning feature 26 such as a key, shaped to reversibly interlock with clamping device 30. The frame has an aperture 28 to allow access to a brain of the animal.

In one embodiment the headplate 20 has an inner frame 22 and an outer frame 24. The positioning feature 26 is present in the outer frame 24. The aperture 28 is present in the inner frame 22. The outer frame 24 of headplate 20 is attached on top of the inner frame 22. In preferred embodiments the inner frame 22 has a ring shape, with the inner frame adapted to be secured to the animal's skull 50.

Figure 2:
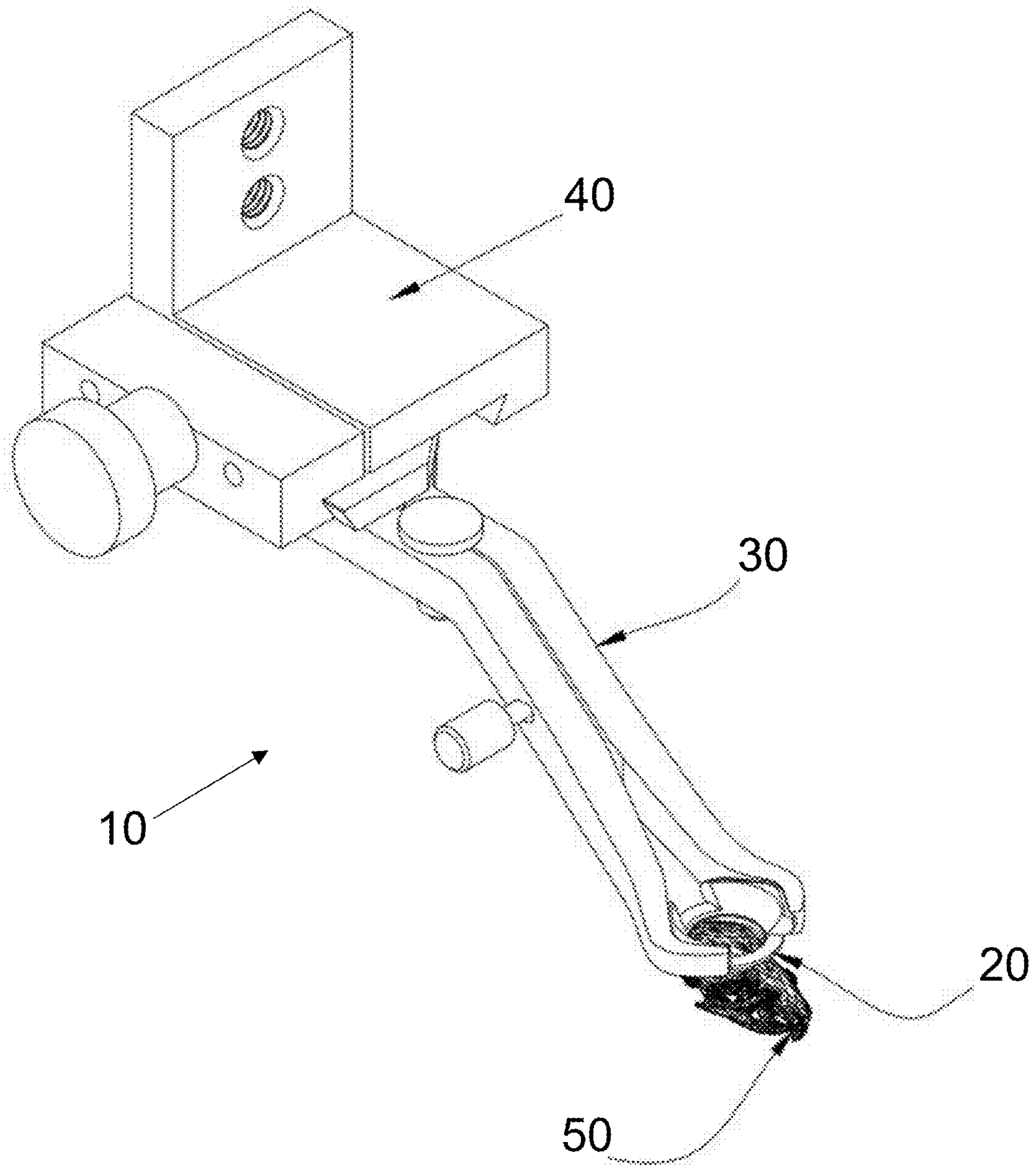
FIG. 2. is an assembled perspective view containing the components described in FIG. 1 and wherein the headplate is shown connected to a small animal's skull.

As shown in FIG. 1, the two other elements of the apparatus are a spring clamping device 30 and a docking frame 40. The spring clamping device 30 is designed to clamp the headplate 20 by having the jaws 31, 32 at the end of the clamping device 30 fit tightly around the outer frame 24 of headplate 20. After the headplate 20 and clamping device 30 are securely connected to each other, the resulting apparatus is connected to the docking frame 40. Once this step is completed, head fixation is achieved as shown in FIG. 2, and subsequently, various head-fixed experiments and recordings may be performed. In the shown embodiment, the spring clamping device 30 can be actuated with one hand.

In a preferred embodiment, clamping device 30 is adapted to be one-hand actuated and has a right jaw 31 and a left jaw 32 at a headplate attachment end that reversibly interlock with the frame positioning feature 26 of headplate 20. The clamping device comprises a movable handle 34 and a non-movable handle 33 to manipulate the jaws 31, 32 and selectively provide the reversible interlock between the jaws and the positioning feature of the headplate frame 21.

The movable handle 34 and the non-movable handle 33 are hingedly connected at a pivot point 37. The pivot point 37 is constructed by a permanently attached pin that goes through both handles, in a manner similar to that found in a typical pair of scissors. Clamping device 30 has a positioning feature 35 preferably in the form of a keyhole which reversibly interlocks with the positioning feature or key 26 of frame 21.

In the shown embodiment, clamping device 30 and docking frame 40 are connected through a dovetail connection. Docking frame 40 thus includes a port 48 for receiving clamping device 30. Headplate 20 and one-hand actuated spring claiming device 30 are connected through the jaws of the clamping device 30 fitting tightly around the outer frame 24 of the headplate 20 based on an oval shape. The oval-shaped fit between the headplate and clamp provides a key feature for smooth head-fixation: As the clamp closes onto the headplate, the oval shape mechanically slides into its final position within the clamping device, and remains stable thereafter even prior to any fastening. This passive compliance between headplate 20 and one-hand actuated spring clamping device 30 facilitates and accelerates the head-fixation operation, thus contributing to the goal of reducing stress for the handled animal. Other embodiments may use alternative designs for connecting the three main elements of the invention, while maintaining the aforementioned principle of a fast and easy manual operation when connecting the elements.

Figure 3:
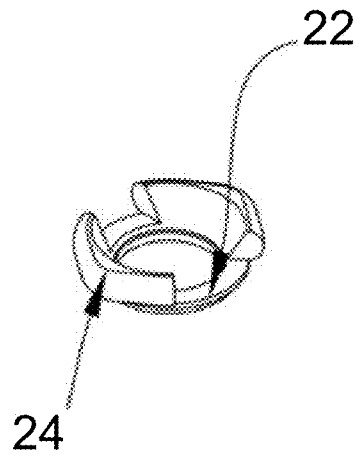
FIG. 3. is a perspective view of one embodiment of the headplate of the present invention.

As shown in FIG. 3, the headplate 20 in one embodiment comprises an inner frame 22 and an outer frame 24. The inner frame 22 is shaped as a flat ring, to maximize the contact surface available for attachment to the skull while also providing an open space, enclosed by the flat ring shape of inner frame 22, for access to the small animal's brain. In other embodiments, the inner frame might be shaped to follow the surface shape of the skull of the small experimental animal or to minimize the area in which it touches the skull for minimally invasive head fixation. In the current embodiment, the outer frame 24 is attached on top of or integrated with inner frame 22 so as to not impinge on the open space it encloses. Furthermore, it is shaped to fit the jaws of the clamping device 30. In some embodiments, the headplate might be solid. In some embodiments, the headplate might be hollowed out or have material removed to decrease the weight of the headplate.

Figure 4:
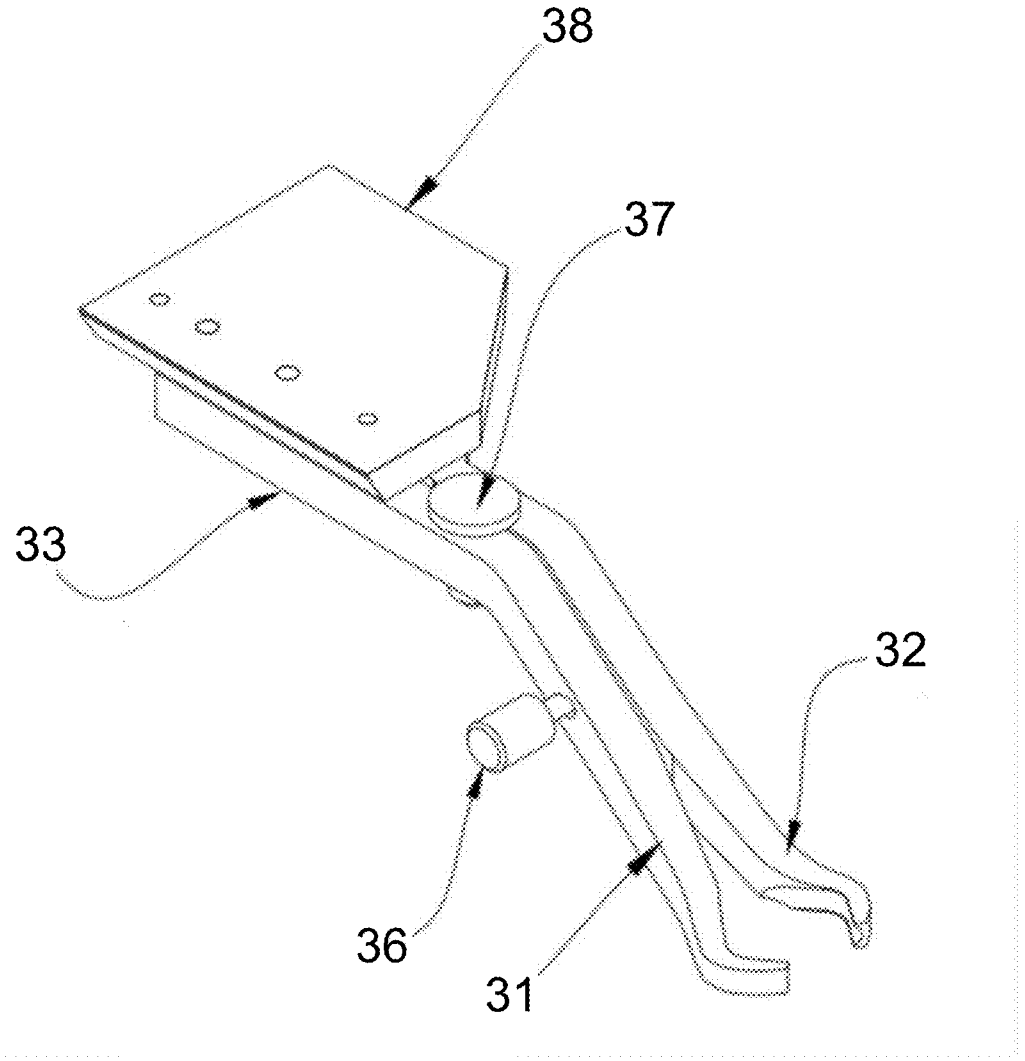
FIG. 4. is a perspective view of one embodiment of the clamping device of the present invention.

As shown as part of the whole invention in FIG. 1, and shown in isolation in FIG. 4, the apparatus comprises a spring clamping device 30. In the present embodiment, the clamping device 30 comprises a movable handle 34 and a non-movable handle 33, resulting in a movable jaw 32 and a non-movable jaw 31. This is achieved by permanently attaching the non-movable handle 33 to the connecting plate 38. In the present embodiment, the spring clamping device can be operated with one hand, facilitating fast head fixation.

Figure 5:
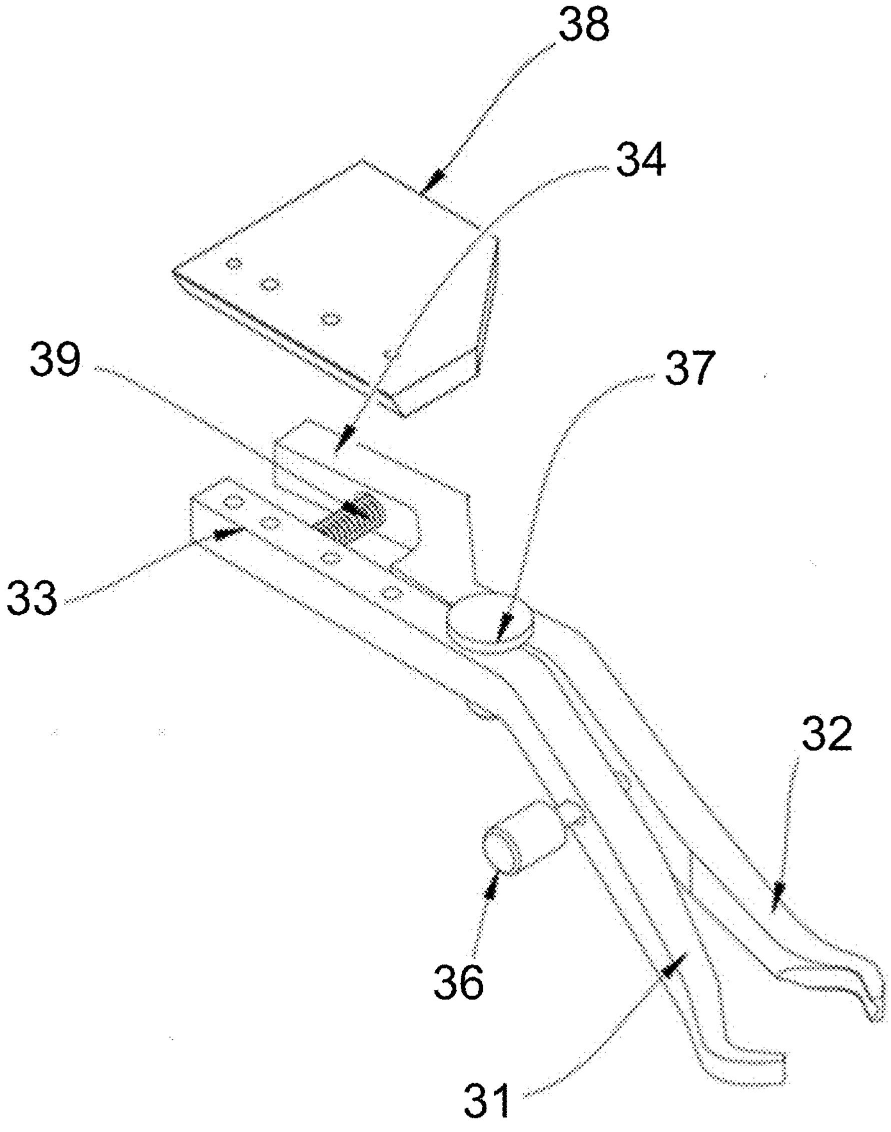
FIG. 5. is a partially exploded perspective view of one embodiment of the clamping device of the present invention.

As shown in FIG. 5, the clamping action in the present embodiment is supported by connecting the two halves of the clamping device through a pivot point 37, and by having a spring 39 positioned between handles 33 and 34. The spring 39 applies permanent closing pressure, maintaining clamping device 30 closed by default. This effect might be achieved in other manifestations by different means, for example by magnetic forces or springs pushing apart or pulling together the clamp jaws at different positions. In the present embodiment, a screw 36 is inserted into both jaws, and when tightened locks the jaws in the closed position. Other embodiments may include different mechanisms to lock the jaws in the closed position either manually or automatically, such as magnets, spring-loaded latches, or pins. As shown in FIG. 4, in the present embodiment the spring clamp device can be opened, after screw 36 has been loosened, by pressing with a finger (typically the thumb for right-handed users) onto the protruding end of the moveable left handle and pushing the movable handle 34 towards non-movable handle 33.

Figure 6:
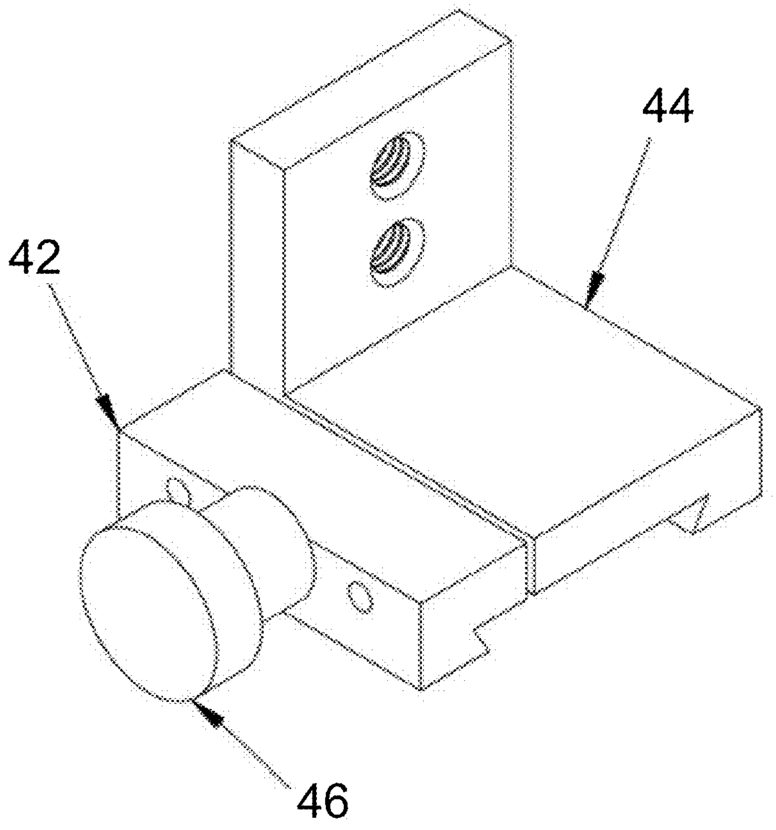
FIG. 6. is a perspective view of one embodiment of a docking frame of the present invention.

As shown in FIG. 6, the invention comprises a docking frame 40. In the present embodiment, the connection between the spring clamping device 30 and the docking frame 40 is based on a dovetail system. Connecting plate 38 is shaped so as to slide into docking frame 40 horizontally. The docking frame comprises two elements, an adjustable end 42 and a fixed end 44. A locking screw 46 is used to move the adjustable end 42 closer to the fixed end 44, resulting in a fastening of the spring clamp device 30 to the docking frame 40, as shown in FIG. 2. In other embodiments, the docking frame can be integrated into a larger apparatus. In other manifestations, the docking frame might not comprise multiple parts, but other mechanisms to connect to the spring clamping device. These mechanisms may, for example, be slots shaped like the connecting plate 38 in which the connecting part can be inserted and tightened with a screw.

Therefore, in one embodiment, an apparatus for the head-fixation of small animals is disclosed, comprising at least: a headplate that attaches to the animal's skull; a docking frame; and a one-hand actuated, passively compliant, clamping device to connect to the headplate on one end, and to the docking frame on the other end.

In a preferred embodiment, the apparatus comprises: two jaws; two handles; a pivoting point for pivotally connecting the jaws together; a spring between the handles that applies a closing force onto the jaws; a connecting plate, to which one of the handles is permanently attached, wherein only one jaw is movable by applying force onto its handle; a screw that locks the jaws in the closed position; and a protruding end on one of the handles enabling one-handed actuation of the spring clamping device.

The connection between the clamping device and headplate is designed to be passively compliant: The user may connect the headplate and clamping device imperfectly in an initial attempt, but the connection will passively slide into its final, stable position. This is achieved by a combination of 1) the geometrical shape and fit of the headplate/clamping device couple, and 2) the default position of the clamp—spring-constrained—as closed. Passive compliance accelerates the head-fixation operation by minimizing the number of attempts and any other positioning adjustments, and as such is a key feature for stress minimization of the small laboratory animals.

Advantageously, the one-hand actuated clamping device is handheld. Based on its shape, weight and overall size, a typical user is able to hold and operate the device with one hand.

The device is portable and usable away from the docking frame and the brain/behavior recording apparatus. Specifically, the hand-held clamping device may be used in an environment different from the experimental apparatus, for example the animal home cage, to gain familiarity with the head-fixation process. The animal implanted with a headplate can get used to the head-fixation operation in a more familiar environment. In such an environment, the head-fixation operation may be practiced dozens of times, and the animal rewarded in the process. One-handed operation of the clamping device frees a hand for handling the animal. As such, handheld, one-handed operation of the clamping device are key features for stress minimization of the small laboratory animals.

For the avoidance of doubt, the apparatuses and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

REFERENCE NUMBER LIST

10 Apparatus
20 Headplate
21 Frame
22 Inner frame of headplate
24 Outer frame of headplate
26 Key positioning feature
28 Aperture
30 One-hand actuated spring clamping device
31 Right jaw of clamping device
32 Left jaw of clamping device
33 Right handle (static) of clamping device
34 Left handle (movable) of clamping device
35 Position feature/keyhole
36 Locking screw for jaws of clamping device
37 Clamping device's pivoting and connecting point
38 Connecting plate
39 Spring
40 Docking frame
42 Adjustable end of docking frame
44 Fixed end of docking frame
46 Locking screw of docking frame
48 Port
50 Small animal skull (here, a mouse)

What is claimed is:

1. An apparatus for head fixation of small animals, comprising:
- a headplate that is adapted to be secured to an animal's skull, wherein the headplate includes a frame having a positioning feature shaped to reversibly interlock with a clamping device, wherein the frame has an aperture to allow access to a brain of the animal;
- a docking frame having a port for forming a reversible interlocking connection to the clamping device; and
- the clamping device, wherein the clamping device is adapted to be one-hand actuated and has jaws at a headplate attachment end that reversibly interlock with the frame positioning feature of said headplate, wherein the clamping device comprises a movable handle and a non-movable handle to manipulate the jaws and selectively provide the reversible interlock between the jaws and the positioning feature of the headplate frame.

2. The apparatus according to claim 1, wherein the headplate has an inner frame and an outer frame, wherein the positioning feature is present in the outer frame, and wherein the aperture is present in the inner frame.

3. The apparatus according to claim 2, wherein the outer frame of the headplate is attached on top of the inner frame of the headplate.

4. The apparatus according to claim 2, wherein the positioning feature includes a key that interlocks with a keyhole present in at least one of the jaws.

5. The apparatus according to claim 4, wherein the inner frame has a ring shape, and wherein the inner frame is adapted to be secured to the animal's skull.

6. The apparatus according to claim 1, wherein the movable handle and the non-movable handle of the clamping device are hingedly connected at a pivot point, and wherein a spring is present between the movable handle and non-movable handle that biases the jaws towards each other.

7. The apparatus according to claim 1, wherein the movable handle and the non-movable handle of the clamping device are adapted to be locked into position using a screw that is connected to the jaws.

8. The apparatus according to claim 1, wherein the clamping device includes a connecting plate attached to the non-movable handle, and wherein the connecting plate reversibly interlocks with the port of the docking frame.

9. The apparatus according to claim 8, wherein the docking frame comprises an adjustable end and a locking end to secure the docking frame to the connecting plate of the clamping device.

10. The apparatus according to claim 1, wherein the docking frame and the clamping device are attached using a dovetail interlocking connection, wherein the docking frame comprises a dovetail socket and the clamping device comprises a dovetail pin that slides into the docking frame dovetail socket.

11. The apparatus according to claim 1, wherein the interlocking between the headplate and the clamping device is passively compliant whereby a user may connect the headplate and clamping device imperfectly in an initial attempt whereafter the interlocking is completed passively with the headplate positioning feature sliding into a keyhole present in at least one of the jaws of the clamping device.

12. An apparatus for head fixation of small animals, comprising:

a headplate that is adapted to be secured to an animal's skull, wherein the headplate includes a frame having a positioning feature shaped to reversibly interlock with a clamping device, wherein the frame has an aperture to allow access to a brain of the animal; and the clamping device, wherein the clamping device is adapted to be one-handed actuated and has jaws at a headplate attachment end that reversibly interlock with the frame positioning feature of said headplate, wherein the clamping device comprises a movable handle and a non-movable handle to manipulate the jaws and selectively provide the reversible interlock between the jaws and the positioning feature of the headplate frame.

13. The apparatus according to claim 12, wherein the headplate has an inner frame and an outer frame, wherein the positioning feature is present in the outer frame, and wherein the aperture is present in the inner frame, and wherein the outer frame of the headplate is attached on top of the inner frame of the headplate.

14. The apparatus according to claim 13, wherein the inner frame has a ring shape, and wherein the inner frame is adapted to be secured to the animal's skull.

15. The apparatus according to claim 14, wherein the positioning feature includes a key that interlocks with a keyhole present in at least one of the jaws, wherein the movable handle and the non-movable handle of the clamping device are hingedly connected at a pivot point, and wherein a spring is present between the movable handle and non-movable handle that biases the jaws towards each other.

16. The apparatus according to claim 15, wherein the movable handle and the non-movable handle of the clamping device are adapted to be locked into position using a screw that is connected to the jaws.

17. A method for head fixation of small animals, comprising the steps of:

obtaining the apparatus according to claim 1;

securing the headplate to an animal's skull;

manipulating the clamping device to reversibly interlock the positioning feature of the headplate with a corresponding positioning feature of the jaws; and forming a reversible interlocking connection between the docking device and the clamping device.

18. The method according to claim 17, wherein the interlocking between the headplate and the clamping device is passive compliant where a user connecting the headplate and clamping imperfectly allows passive completion of the interlocking by the apparatus whereby the headplate positioning feature slides into a keyhole present in at least one of the jaws of the clamping device.

19. The method according to claim 18, further including the step of attaching the docketing frame and clamping device using a dovetail interlocking connection, wherein the docketing frame comprises a dovetail socket and a clamping device comprises a dovetail pin that slides into the docking frame dovetail socket.

20. A method for head fixation of small animals, comprising the steps of:

obtaining the apparatus according to claim 12;

securing the headplate to an animal's skull;

manipulating the clamping device to reversibly interlock the positioning feature of the headplate with a corresponding positioning feature of the jaws; and forming a reversible interlocking connection between the docking device and the clamping device.

* * * * *